Jan. 7, 1936.  R. H. GODDARD  2,026,885
AIRCRAFT
Filed Sept. 23, 1931  10 Sheets-Sheet 2
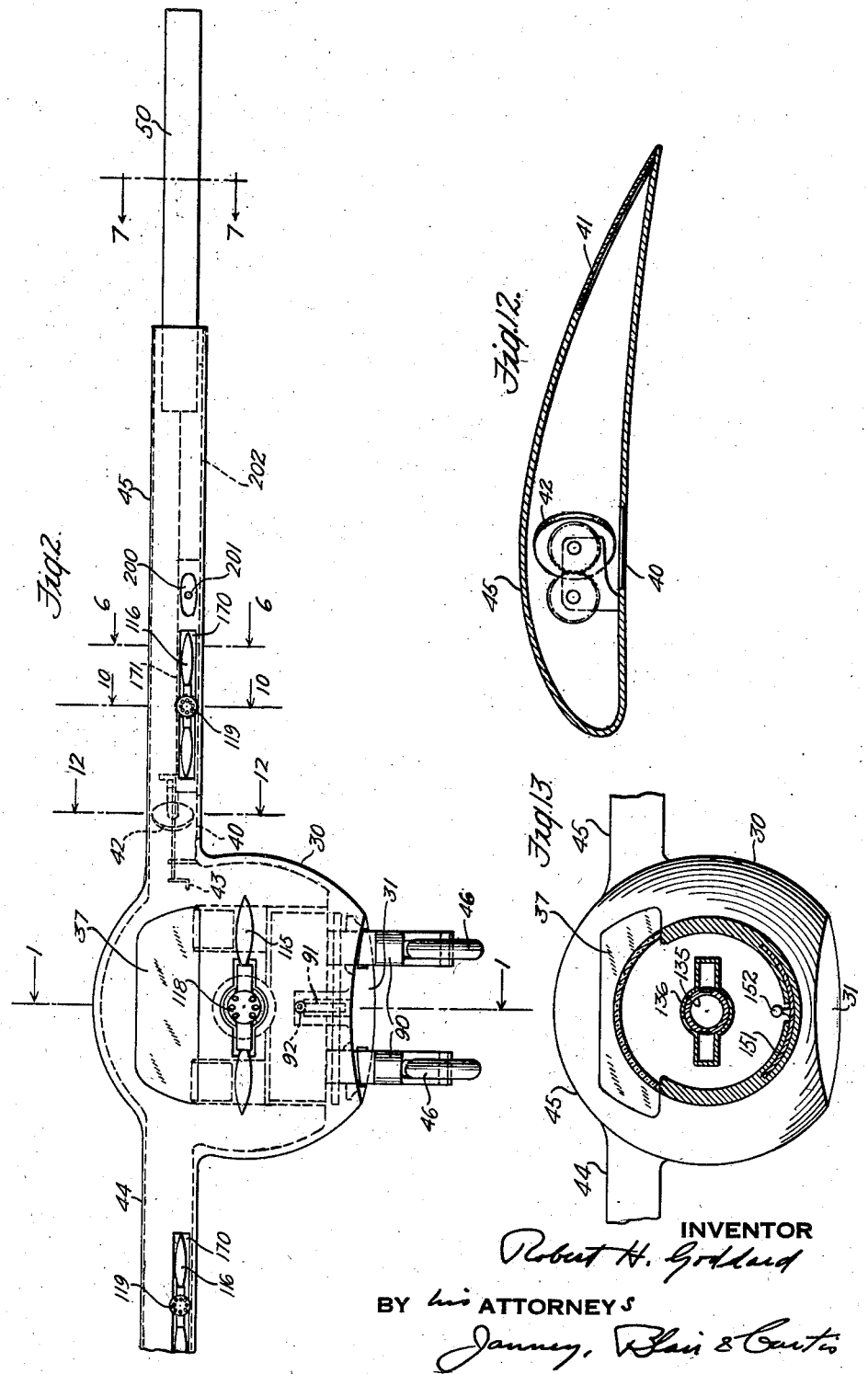
INVENTOR
Robert H. Goddard
BY his ATTORNEYS
Janney, Blair & Curtis

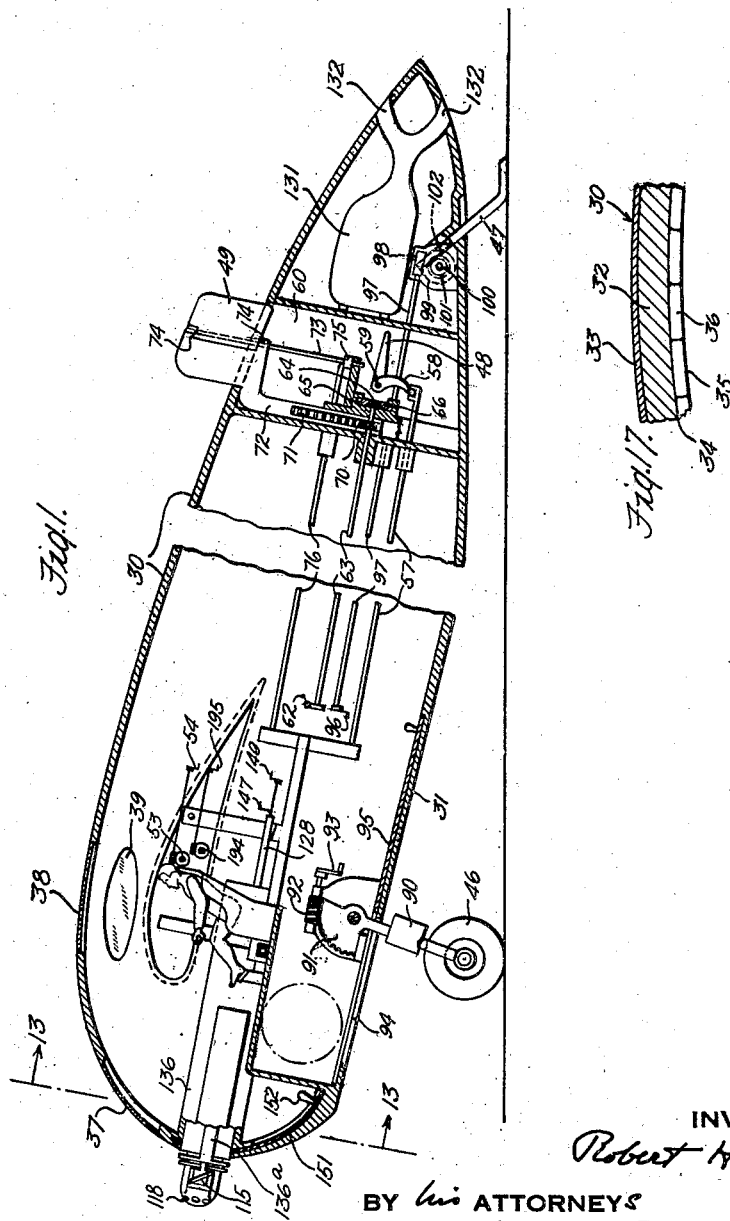

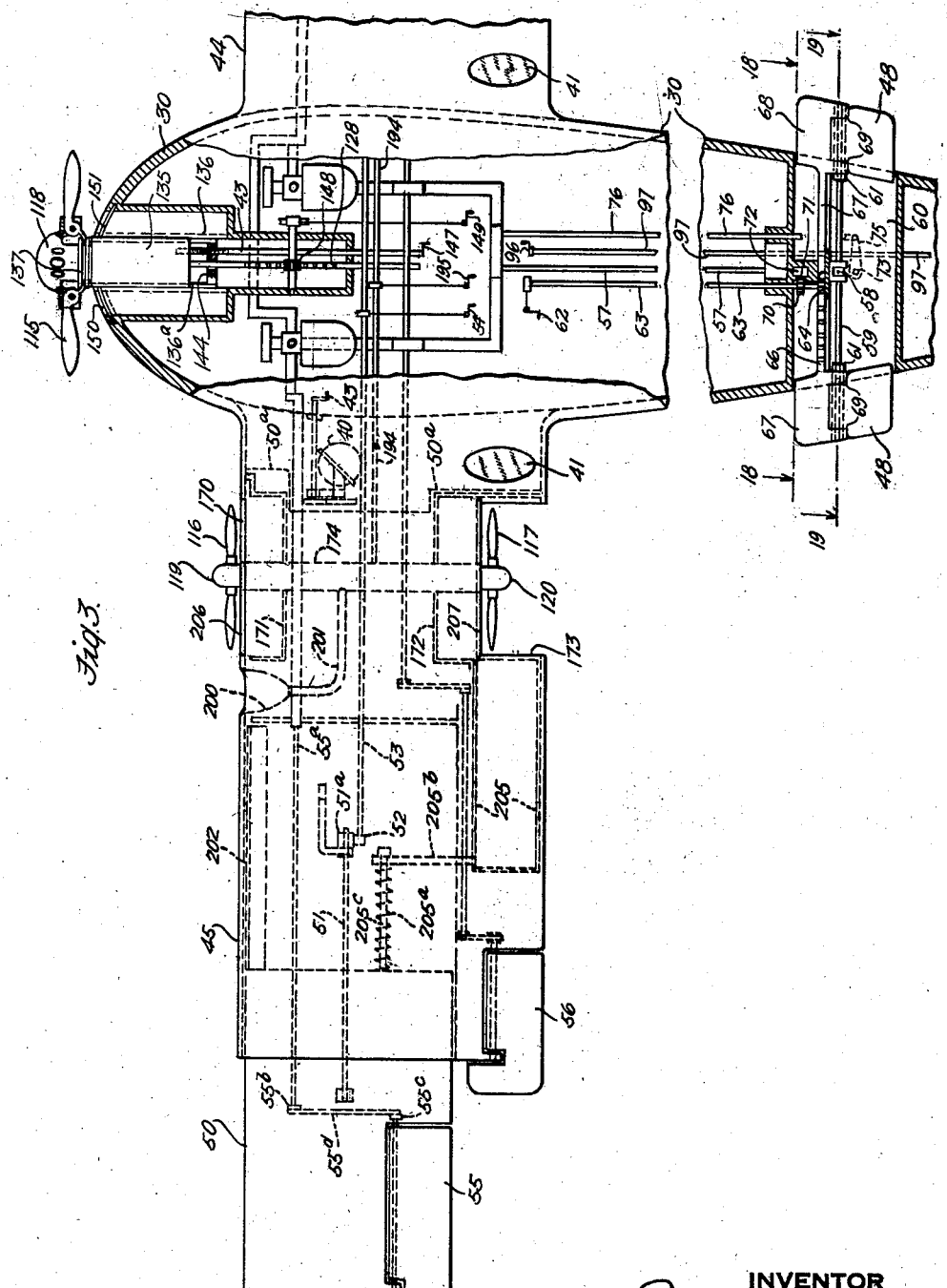

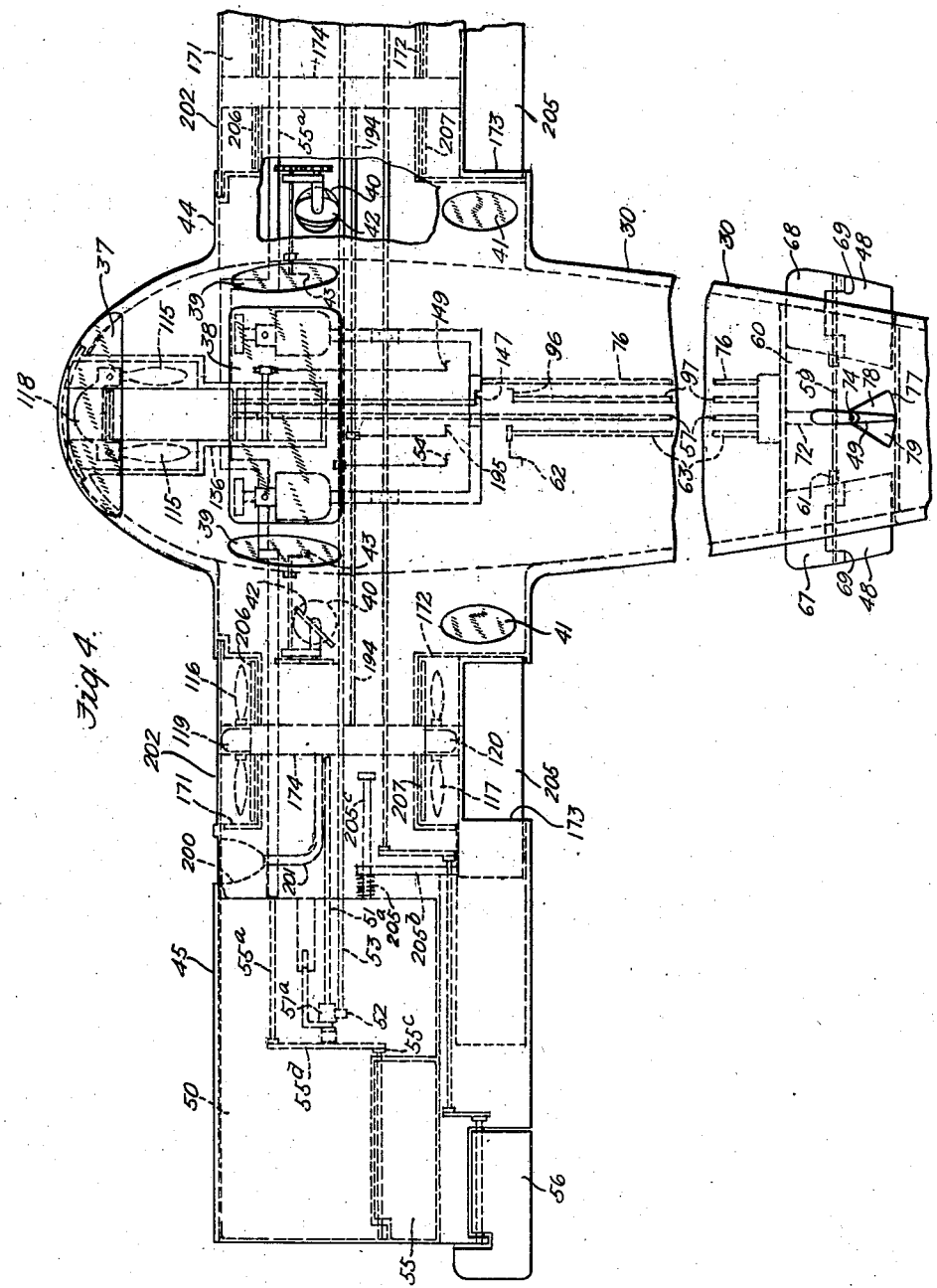

Jan. 7, 1936.  R. H. GODDARD  2,026,885
AIRCRAFT
Filed Sept. 23, 1931   10 Sheets-Sheet 5
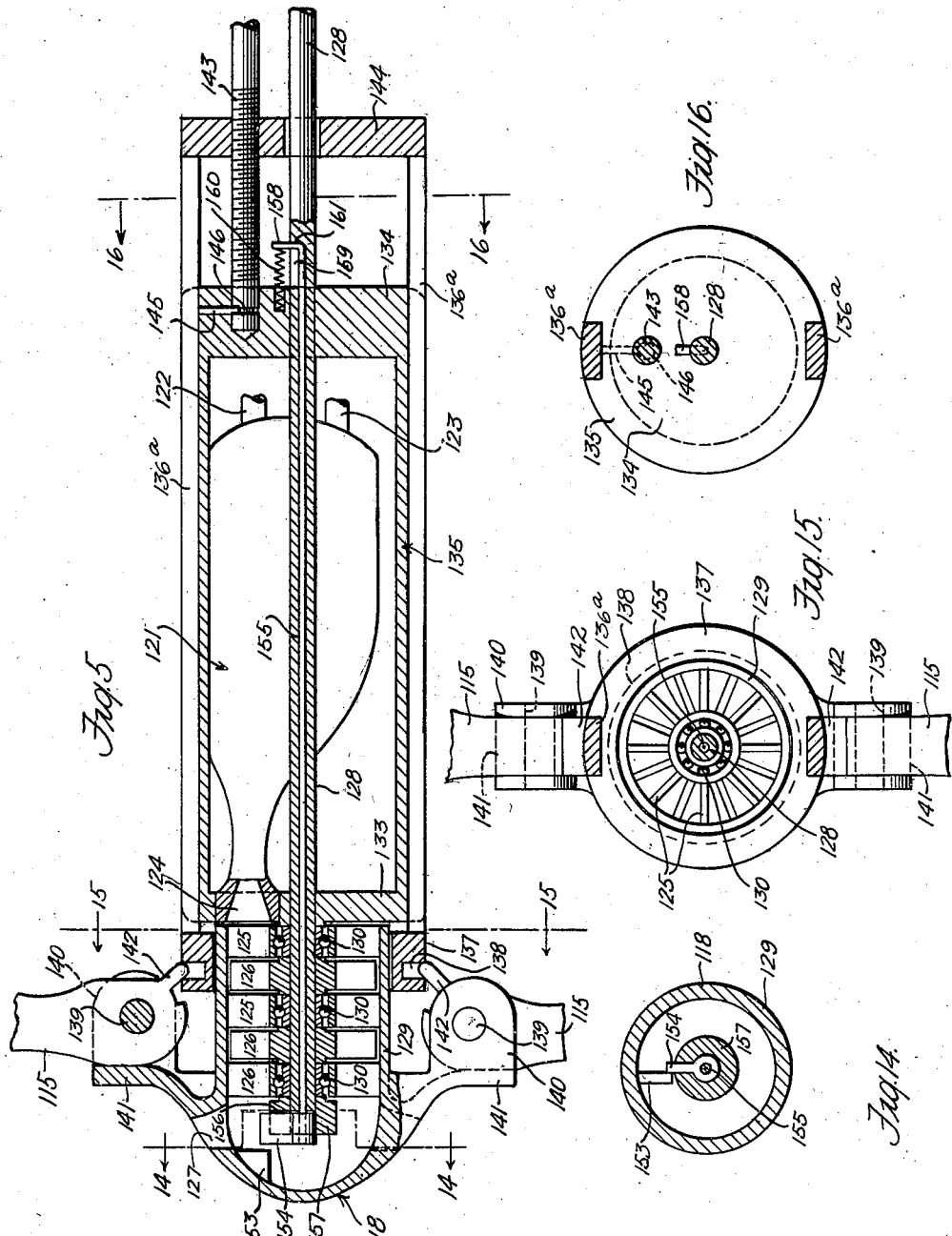
INVENTOR
Robert H. Goddard
BY his ATTORNEYS

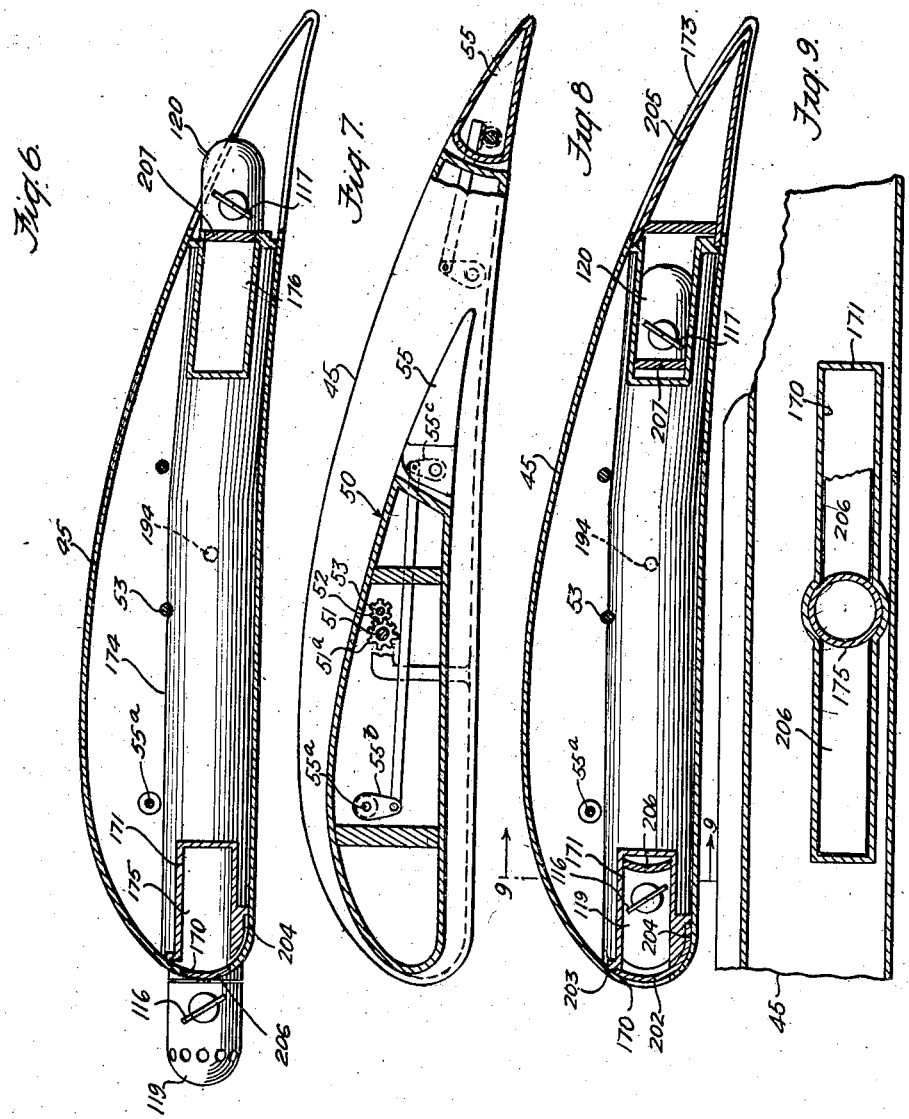

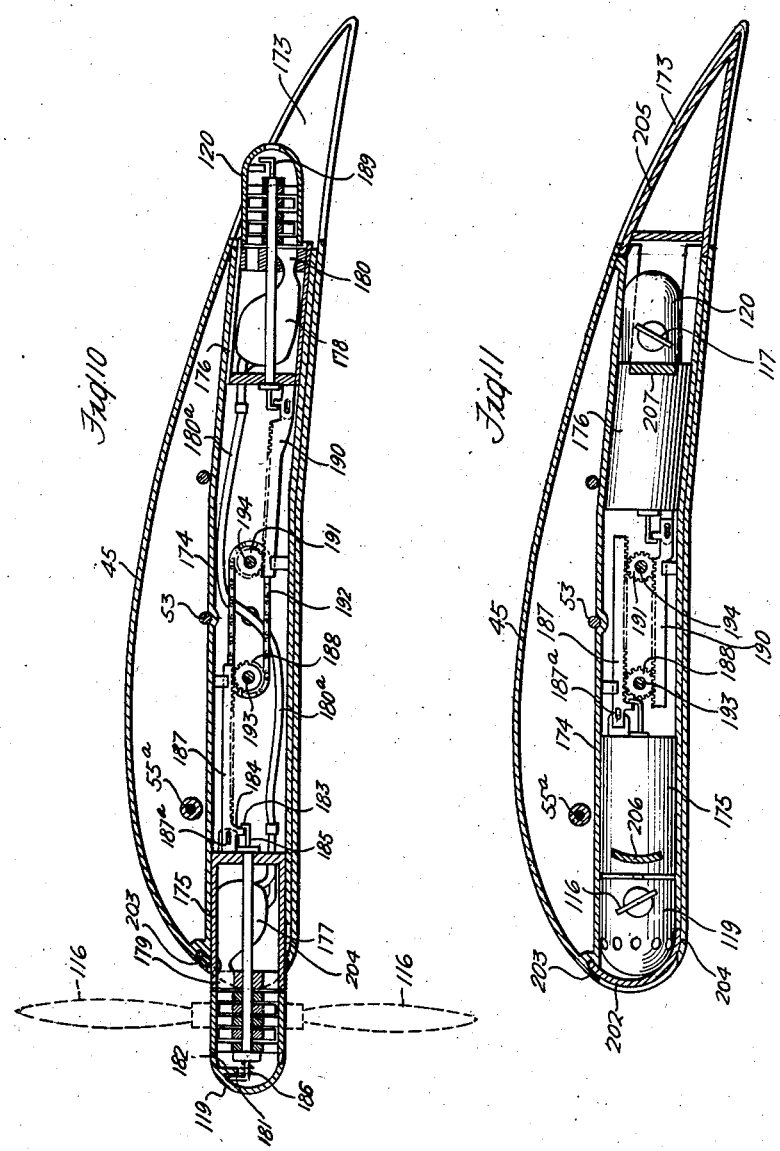

Jan. 7, 1936.          R. H. GODDARD          2,026,885
                           AIRCRAFT
                    Filed Sept. 23, 1931     10 Sheets-Sheet 8
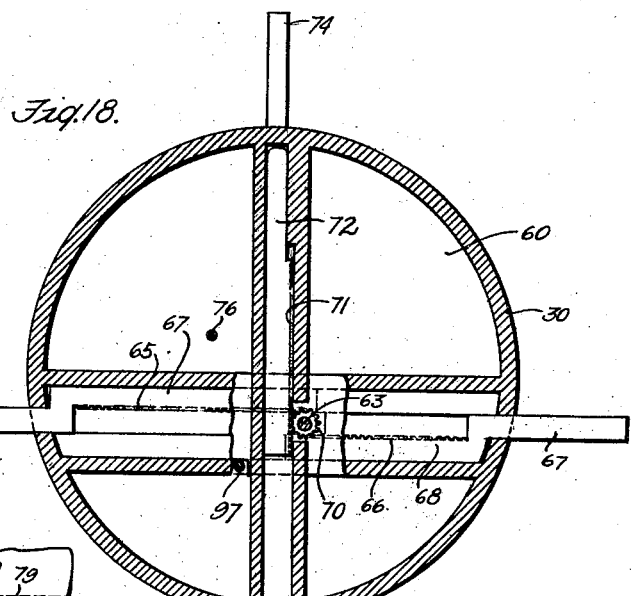
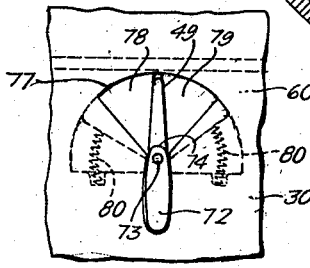
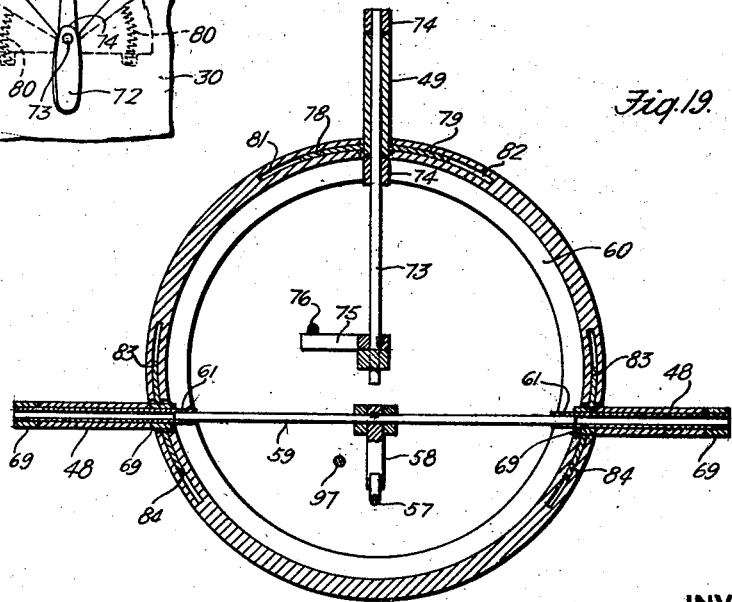
INVENTOR
Robert H. Goddard
BY his ATTORNEYS
Janney, Blair & Curtis

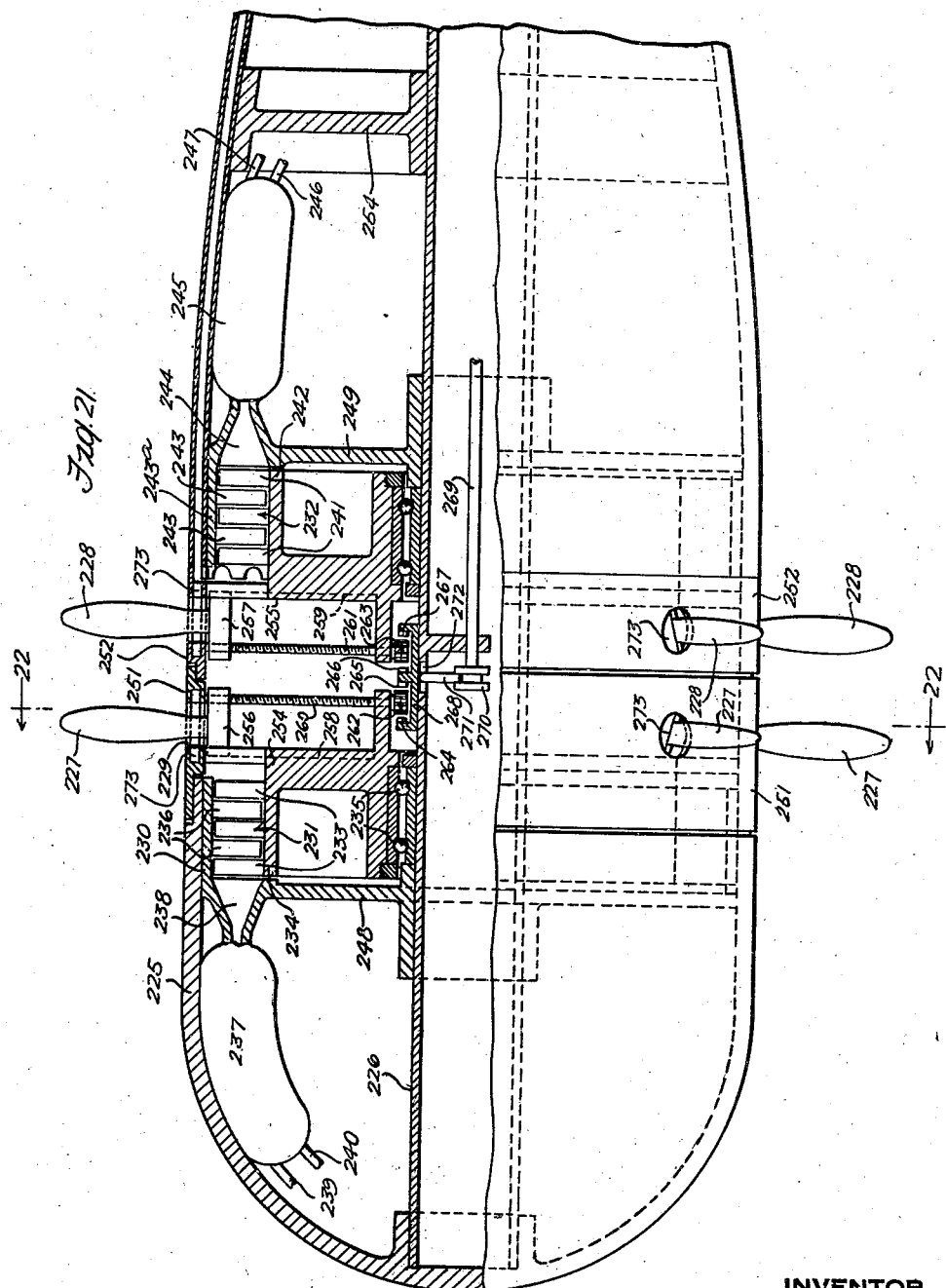

Jan. 7, 1936.  R. H. GODDARD  2,026,885
AIRCRAFT
Filed Sept. 23, 1931   10 Sheets-Sheet 10
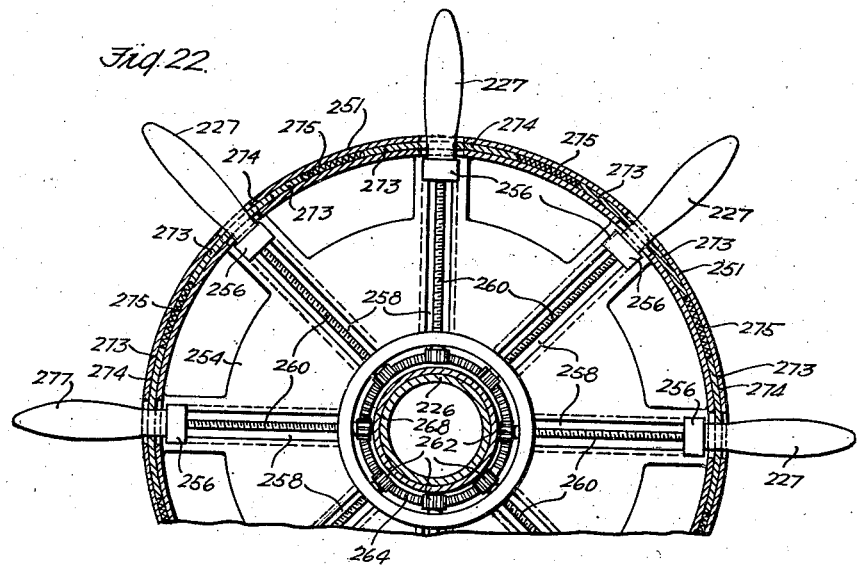
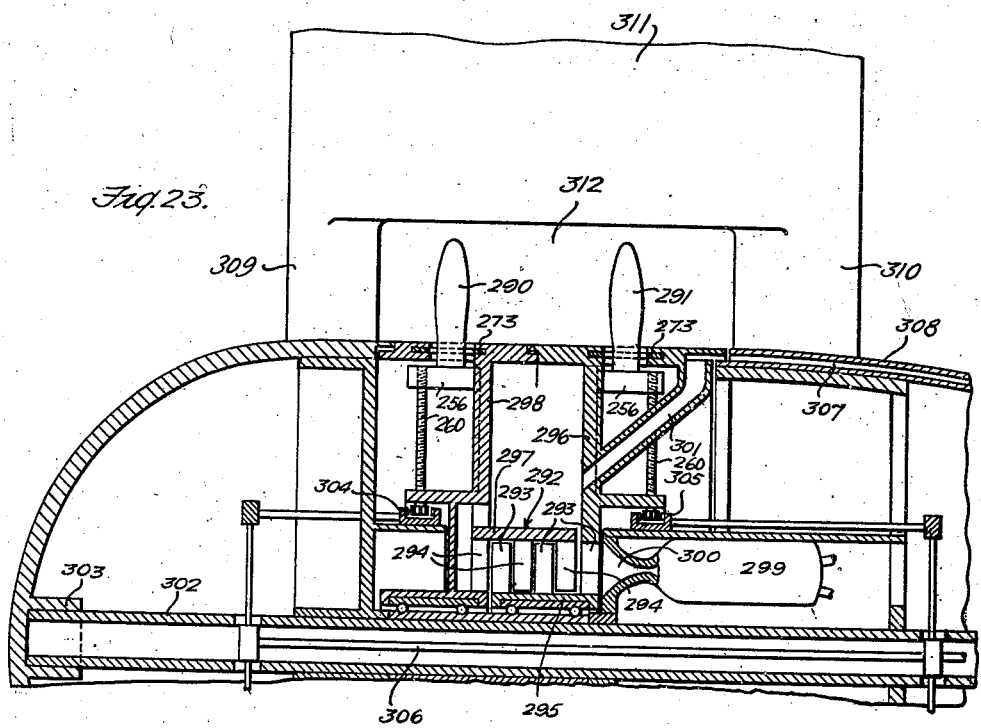
INVENTOR
Robert H. Goddard
BY his ATTORNEYS
Janney, Blair & Curtis Patented Jan. 7, 1936

2,026,885

UNITED STATES PATENT OFFICE 2,026,885

AIRCRAFT

Robert H. Goddard, Roswell, N. Mex.

Application September 23, 1931, Serial No. 564,503

5 Claims. (Cl. 244—25)

This invention relates to aircraft and particularly the heavier than air type.

One of the objects of this invention is to provide an aircraft of this type which is simple and practical in construction and which is capable of efficient operation in the stratosphere as well as in the troposphere.

Other objects are to enable the aircraft to be driven at very high speeds, to permit the means of propulsion to be changed in flight; to provide low air resistance particularly when flying at high speeds; to permit change of the form of the aircraft during flight; to protect the occupants of the aircraft against variation in atmospheric pressure and temperature; to permit the propellers and/or driving engines to be retracted into the fuselage or wings during flight; to provide improved driving means for the propellers; and to facilitate the operation and control of the aircraft. Further objects will be in part obvious and in part pointed out hereinafter.

The invention accordingly consists in the features of construction, combinations of elements, and arrangements of parts as will be exemplified in the structure to be hereinafter described, and the scope of the application of which will be indicated in the following claims.

In the accompanying drawings in which are shown, more or less diagrammatically, the features of a selected embodiment of the invention, Fig. 1 is a central vertical sectional view substantially on the line 1—1 of Fig. 2;

Fig. 2 is a partial front elevation;

Fig. 3 is a partial plan view with the parts in extended position, portions of the body or fuselage being broken away;

Fig. 4 is substantially the same as Fig. 3 except that the parts are in retracted position;

Fig. 5 is a detail longitudinal sectional view of the main turbo-propeller on the forward end of the body of the aircraft;

Fig. 6 is a sectional view substantially on the line 6—6 of Fig. 2;

Fig. 7 is a sectional view substantially on the line 7—7 of Fig. 2;

Fig. 8 is substantially the same as Fig. 6 except that the parts are in retracted position;

Fig. 9 is a detail sectional view substantially on the line 9—9 of Fig. 8;

Fig. 10 is a sectional view substantially on the line 10—10 of Fig. 2, the parts being in extended position;

Fig. 11 is substantially the same as Fig. 10 except that the parts are in retracted position;

Fig. 12 is a sectional view substantially on the line 12—12 of Fig. 2;

Fig. 13 is a sectional view substantially on the line 13—13 of Fig. 1;

Fig. 14 is a detail sectional view substantially on the line 14—14 of Fig. 5;

Fig. 15 is a detail sectional view substantially on the line 15—15 of Fig. 5;

Fig. 16 is a detail sectional view substantially on the line 16—16 of Fig. 5;

Fig. 17 is a detail sectional view;

Fig. 18 is a detail sectional view substantially on the line 18—18 of Fig. 3;

Fig. 19 is a detail sectional view substantially on the line 19—19 of Fig. 3;

Fig. 20 is a detail view;

Fig. 21 is a partial longitudinal sectional view of the body of the aircraft illustrating a modified form of the propeller mechanism;

Fig. 22 is a transverse sectional view substantially on the line 22—22 of Fig. 21, and Fig. 23 is substantially the same as Fig. 21 illustrating a further modified form.

Similar reference characters refer to similar parts throughout the several views of the drawings.

The aircraft forming the subject matter of the present invention is adapted to be used in the stratosphere as well as in the troposphere. In the troposphere the density of the atmosphere renders the propeller type of propulsion efficient but, at high altitudes and particularly in the stratosphere, the rare atmosphere causes this form of propulsion to become relatively inefficient. Highly satisfactory results may be obtained at such altitudes and in the stratosphere by directly exhausting gases at high velocity or what is known as rocket propulsion and high speeds of the aircraft may be obtained thereby. With my improved aircraft, both of these methods of propulsion have been incorporated and they may be used selectively or simultaneously.

When operating at high speeds, whether by rocket propulsion or otherwise, it is desirable that the air resistance be reduced to the minimum and this may be largely effected by the use of stream line construction and the elimination of projecting parts wherever possible.

*The general construction*

Referring particularly to Figs. 1 to 4, the casing 30 of the aircraft is of stream line form in order that wind resistance may be reduced to a minimum, except that the under portion thereof as at 31 may be somewhat flattened in order to produce a lifting action at high speeds. The walls may be of any suitable construction and, in view of the high altitudes in which the craft may be operated and the low temperature there encountered, it is desirable that the same be substantially air-tight and provided with some form of heat insulation. A satisfactory type of wall construction is illustrated in detail in Fig. 17 in which a layer of felt as 32 or other light non-conductor of heat is provided between the outer casing 33 and an inner wall 34. Between this wall 34 and an inside wall 35 may be provided an air space as 36 which may be cellular in form and this acts to furnish additional heat insulation while adding little to the weight of the aircraft. A similar arrangement may be utilized in the wings. Windows as 37, 38, 39, 40 and 41 are provided to give to the operators observation in practically all directions, and these are flush with the outer surface of the casing and form a continuation thereof. The windows 37 and 38 respectively provide forward and upward observation. Side observation is provided by the windows 39. Downward observation is procured through the windows 40 and rearward view is obtained through the windows 41 in the trailing edge of the wings. Shiftable mirrors as 42 may be provided to enable the operator to look through the windows 40 and 41, the position of the mirror being shifted by turning a crank 43.

The fuselage of the aircraft is provided with oppositely extending wings 44 and 45, landing wheels 46, tail skid 47, elevators 48 and a vertical rudder 49. The wings 44 and 45 are extensible and to this end are provided with corresponding movable sections or tips 50 which are arranged to telescope within the main wing so that when the craft is being driven at high speed and less wing surface is necessary, these wing tips may be partially or wholly withdrawn within the wing proper and thus permit of increased speed due to the diminished air resistance. Various methods may be provided for extending and withdrawing the wing tips 50 as, for example, by means of a screw shaft 51 (Fig. 3) moved longitudinally in either direction by a journaled nut 51a thereon having spur gear teeth meshing with the teeth of a driving pinion 52 on a shaft 53 rotated from a handle 54 within the body of the aircraft. Rotation of this shaft 53 causes both wing tips to be simultaneously withdrawn or extended. A substantially air-tight joint may be provided between the movable sections or tips 50 and the corresponding wings within which they fit as by suitable packing; or a diaphragm 50a may be used to maintain air at normal pressure in the aircraft. Ailerons 55 may be provided in each of the extensible tips 50 to be operated from the control stick by a telescoping shaft 55a, arms 55b and 55c and connecting link 55d. The main wings 44 and 45 may likewise be provided with ailerons 56 to be used when the wing tips 50 are in their retracted position (Fig. 4). These may be operated from the control stick in the usual manner.

Referring particularly to Figs. 1, 3 and 18–20, the elevators 48 are operated from the control stick through the medium of a rod 57 which is connected by a crank arm 58 to a shaft 59 extending transversely of the body in an air-tight housing 60. The opposite ends of this shaft 59 are splined within sleeves 61 upon which the elevators are fixed. These elevators are adapted to be partially withdrawn within the housing 60 (Fig. 3) by means of a crank 62 conveniently located within the body of the aircraft. This crank rotates a shaft 63 on which is secured a pinion 64 coacting with racks 65 and 66 on the bars 67 and 68 disposed respectively above and below the pinion to simultaneously cause these bars to move inwardly or outwardly and to carry with them the corresponding elevators 48. This movement of the bars 67 and 68 and the elevators carried thereby is permitted by the sliding movement of the sleeves 61 on the shaft 59, the sleeves being supported in suitable bearings 69 in the outer portion of the bars. Rotation of the crank 62 and shaft 63 likewise causes the rudder 49 to be retracted or extended in the same manner as and simultaneously with the elevators 48. This is accomplished through the medium of a pinion 70 on the shaft 63 which coacts with a rack 71 mounted on a frame 72 in which the rudder 49 is supported. This rudder is rotated by means of a shaft 73 on which it is splined and which passes through suitable bearings 74 in the upper portion of the frame 72. To the lower portion of this shaft 73 is secured an arm 75 to which is connected an operating rod 76 leading from the control stick. Referring to Fig. 20, the rudder 49 operates in an opening 77 in the casing 30 of the fuselage which may be closed at all times by doors 78 and 79 disposed on opposite sides thereof and adapted to swing therewith. These doors may be held against the rudder by springs, as 80. These doors 78 and 79 are movable in corresponding chambers 81 and 82 formed in the casing (Fig. 19). Similar doors as 83 and 84 close the openings provided for each of the elevators 48.

Referring to Fig. 1, the supporting wheels 46 are mounted on shock absorbers 90, one element of which is attached to worm wheel segment members 91 with which mesh worms 92 fastened to shafts having crank handles 93 mounted thereon. By turning the cranks 93 the wheel may be retracted into the body of the aircraft. In the bottom wall 31 of the casing 30 is provided an opening 94 through which the wheels swing in moving to the retracted position, as illustrated in dot and dash lines in Fig. 1. This opening is arranged to be closed by a sliding door 95 after the wheels and frame have been retracted. This door is preferably intended to form an air-tight seal for the opening 94. The tail skid 47 is likewise adapted to be retracted through the medium of a crank or handle 96 mounted on operating shaft 97, worm 98, worm wheel 99, shaft 100, pinion 101 and rack 102, the rack being formed on or attached to the upper portion of the tail skid.

The motive power

Referring particularly to Figs. 2 and 3, it will be seen that in the form shown a propeller 115 is mounted on the nose of the fuselage. Each of the wings 44 and 45 is provided upon the leading edge with a propeller 116 and adjacent the trailing edge with a propeller 117. These propellers are driven by corresponding turbines as 118, 119 and 120 and these turbines are in turn driven by gases which are emitted at high velocity from one or more combustion chambers conveniently arranged within the aircraft and the wings. For the sake of illustration the turbine 118 is shown in detail in Fig. 5 of the drawings and a description of this will apply equally to the other turbines as the construction and arrangement are substantially the same. Gases or vapors such as oxygen and a hydrocarbon enter the combustion chamber as 121 through flexible supply pipes 122 and 123 respectively connected to sources of supply (not shown) located at convenient points within the body of the aircraft. The gases resulting from combustion within the chamber 121 pass out therefrom through one or more nozzles 124 and, upon leaving the nozzles, impinge successively upon movable turbine blades 125 and fixed turbine blades 126 and exhaust into the atmosphere through suitably arranged passages 127 in the turbine head. The fixed blades 126 are secured upon the central shaft 128 and the movable blades 125 are carried by the rotatable head or casing 129 upon the outside of which are mounted the blades of the propeller. Suitable anti-friction bearings as 130 may be provided for this rotating head. Since the peripheral speed of the turbine blades with this arrangement is less than that of the propeller, while the speed of the gases which impinge on the turbine blades is very high, a multistage turbine is desirable. Preferably, in order to obtain efficiency from the relatively high velocity gases, the blades have a low angle relative to the axis of the blast. The method of igniting the combustible fuel within the chamber 121 will depend largely upon the form of fuel used and any suitable type of ignition means may be provided.

The aircraft may be propelled at a very high speed by the reaction of gases exhausting from a nozzle or nozzles at high velocity. This is commonly referred to as rocket action and will be so termed hereinafter. To this end there is provided in the rear portion of the casing 30 (Fig. 1) a combustion chamber 131 similar in character to the combustion chamber 121 operating the turbine 118, but which has one or more nozzles or vents 132 communicating directly with the atmosphere at or near the tail of the aircraft. Under certain conditions it may be advisable to use both the propeller and the rocket means of propulsion, and it is noted that the rocket propulsion is relatively more efficient at high altitudes, as in the stratosphere, by reason of the fact that the rearward velocity of the gases is greater when the air density is lesser.

Withdrawal of the turbo-propellers

When the aircraft is being propelled by rocket action alone, or by one or more but not all of the propellers, with or without rocket propulsion, the parasite resistance may be materially reduced by withdrawing the inactive propellers into the fuselage or wings. Also, in order to reduce parasite resistance, the wing extensions 50 may be withdrawn and, furthermore, the tail surfaces and elevators 48 as well as the rudder 49 may be partially withdrawn. The complete or partial withdrawal of any of the foregoing will be effected at such times as desired by the pilot, consistent with the maintenance of flotation and/or of lateral, longitudinal and axial stability of the aircraft. Various arrangements and modes of withdrawing the turbo-propellers may be provided. Referring particularly to Figs. 3 and 5, it will be seen that the shaft 128 on which is mounted the turbine 118 is supported by the end walls 133 and 134 of a housing 135 within which is enclosed the combustion chamber 121. This housing is slidable longitudinally within a guide frame 136 on the forward end of which is carried a collar 137 provided with a peripheral groove or channel 138. The blades of the propeller 115 are mounted upon stud shafts 139 supported by oppositely disposed lugs 140 mounted on laterally projecting arms 141 on the casing 129, the arms forming shoulders to prevent the blades from swinging forwardly beyond their vertical position, receiving the thrust of the propeller. Each of the propeller blades is provided with a projecting finger 142 which enters the channel 138 in the collar 137 so that when the collar 137 is pushed forwardly the blades of the propeller will swing inwardly substantially into the folded position shown in Fig. 4. This folding of the blades is accomplished by a screw 143 which is threaded through the rear wall 144 of a slide frame 136a and which has its forward non-threaded end retained within the head 134 by a key 145 projecting into a groove 146 in the screw. The slide frame 136a is rigidly connected at its forward end to the collar 137 so as to move the same.

Referring to Fig. 3, the screw 143 may be rotated by a crank or handle 147 conveniently located within the body of the aircraft. To permit the folding of the blades, the casing or head 129 is first moved forwardly sufficiently to enable the blades to swing into folded position without coming in contact with the forward end of the casing 30 of the fuselage. This is accomplished by means of a pinion 148 coacting with a rack on the shaft 128. This pinion is operated from a crank or handle 149 within the body of the aircraft. The head with folded propellers is then withdrawn within the body of the aircraft by reversing the rotation of the handle 149. When completely withdrawn, the parts are in the position indicated in Fig. 4. The opening 150 in the nose of the casing 30 is then closed by a suitable sliding door as 151 (Fig. 1) which may be operated by a handle 152 or in any other suitable manner. The door 151 is preferably shaped to conform to the stream line of the body.

In order that the opening 150 may be as small as possible, it is desirable that the propeller should be stopped in a horizontal position after the power is shut off, and thus the side portions of this opening may be in the form of elongated slots (Fig. 13) of a width only sufficient to permit the blades to pass therethrough. This may be accomplished in various ways, but in the present instance a lug as 153 (Figs. 5 and 14) is formed on the inside of the nose of the casing 129 which will act as a stop to engage a latch 154 projecting forwardly from the shaft 128 and mounted on the end of a rod 155 slidable axially within this shaft. This latch is in the form of a plate which is supported in a slot 156 in a head 157 secured on the end of the shaft 128. The inner end of the rod 155 is bent laterally as at 158 and projects through a slot 159 in the shaft to form a finger which is pressed by a spring 160 normally acting to hold the latch out of engagement with the lug 153. The forward movement of the frame 136a to fold the blades, causes the latch to be moved outwardly into engagement with the lug as the laterally turned end 158 of the rod 155 is in engagement with the shoulder 161 at the end of the slot 159.

The turbines 119 and 120 may be withdrawn into the wings in a manner similar to the withdrawal of the turbine 118 on the nose of the fuselage, but in the present instance the blades of the propellers 116 and 117 are not foldable. Referring particularly to Figs. 2 and 3, it will be seen that the leading edges of the wings 44 and 45 are provided with elongated slots 170 of sufficient dimensions to permit the corresponding turbine and propeller to enter and move rearwardly therein when the propeller is in a horizontal position or that indicated in Fig. 2 of the drawings. A housing as 171 is provided within the wing to receive the turbine and propeller. A similar housing as 172 is provided within the wing to receive the turbine 120 and the propeller 117. On account of the taper in the trailing edge portion of the wing, this edge portion may be cut away as at 173 and the housing 172 located forwardly thereof. A tubular casing as 174 (Fig. 10) extends from front to rear through the wing and it is within this casing that the turbines slide. The construction of the turbines 119 and 120 is substantially identical with that of the turbine 118 so that no further description is necessary. Housings 175 and 176 for the turbines 119 and 120 respectively fit within the casing 174 and are slidable therein. These housings 175 and 176 enclose the combustion chambers 177 and 178 from which the gases are projected into the turbines through the nozzles 179 and 180. The fuel is conducted to these combustion chambers through suitable flexible pipes as 180a from sources of supply located at some convenient point within the aircraft.

The initial rearward movement of certain parts hereinafter described causes a finger 181 to be brought into the path of a lug 182 on the nose of the turbine to stop the blades of the propeller in the proper position to enter the slot 170. This movement of the finger 181 is provided by engagement of a finger 183 with a corresponding finger 184 which draws rearwardly the pull rod 185 on which the fingers 181 and 183 are formed. A spring 186 normally acts to yieldingly hold the fingers 181 and 182 out of engagement when the turbine is operating. The finger 184 is attached to or formed on a rearwardly extending rack bar 187 which is connected to the rear end of the housing 175 by a pin and slot joint 187a which provides the limited relative movement to cause the finger 184 to engage and move the rod 185 as described. This rack bar is actuated by a pinion 188. The rear turbine 120 is provided with a latching device 189 which acts in the same manner to stop the propeller in proper position to enter the wing. This turbine is withdrawn by a rack 190 which is actuated by a pinion 191, the shafts 193 and 194 carrying the pinions 188 and 191 being operatively connected by a chain or belt as 192. The shaft 194 is the driving member and, by reference to Fig. 3, it will be seen that this may be operated from the crank or handle 195 within the body of the aircraft. This same shaft 194 acts to withdraw the turbines 119 and 120 in the opposite wing 44 in the same manner and simultaneously with the withdrawal in the wing 45. It will be obvious that separate withdrawing means may be provided to enable certain propellers to be stopped and withdrawn while other propellers remain in operation. The turbines and propellers in withdrawn position are shown in Fig. 4 of the drawings. If air is to be used in the combustion of the fuel within the chambers 177 and 178, this may be supplied by providing one or more funnels as 200 in the forward edges of the wings connected to the various combustion chambers by means of pipes as 201.

When the turbines and propellers are withdrawn within the wings in the manner described, it is advisable that some form of door be provided to close each of the openings so that the air resistance may be maintained as low as possible and the stream line retained. One method of accomplishing this is illustrated in Figs. 3 and 8 of the drawings in which a door 202 mounted on the inner end of the wing tip 50 slides longitudinally of the wing in suitable guides as 203 and 204 to close the openings 170 and 200 in the leading edge as the wing tip is retracted. A wing section as 205 may be moved by the wing tip 50 in a similiar manner to fill the cut away portion 173. As the wing section 205 moves a less distance than the wing tip 50, the inward movement of this section may be accomplished by a spring 205a acting against an arm 205b on the section 205. When the wing tip moves to extended position, the section 205 is drawn into the wing, as indicated in Fig. 3, by a rod 295c connected at its outer end to the inner end of the wing tip and having its inner end slidably passing through the arm 205b, the inner end of this rod 205c being headed with a head larger than the opening in the arm 205b through which the rod passes. Referring to Figs. 8 and 9, it will be seen that laterally projecting plates as 206 may be provided on opposite sides of the turbine casing 175 so that when the turbines are in their extended position as in Fig. 6, these plates will form a stream line closure for the slot 170 in the manner best shown in Figs. 6 and 9. Similar plates as 207 may be provided on the turbine casing 176 for the same purpose.

In Figs. 21 to 23 inclusive, are shown modifications of the aircraft structure in which the turbines for the main driving propellers are enclosed within the body or fuselage 225 of the aircraft and the propeller blades project from and may be withdrawn into such fuselage. This simplifies the stream lining of the aircraft and facilitates the withdrawal of the propeller blades.

Referring particularly to Fig. 21, the casing 225 of the fuselage is provided with a central longitudinal shaft 226 which forms the main support therefor. Two sets of propeller blades 227 and 228 project through an annular slot 229 in the casing, the blades of one set preferably rotating in the opposite direction from the other set in order to equalize torque on the aircraft and obtain more efficient driving action. The blades 227 are driven by a turbine 231 and the blades 228, by a turbine 232.

In the turbine 231 the blades 233 are fixed upon a rotatable drum 234 mounted upon the shaft 226 and provided with suitable anti-friction bearings as 235. The blades 236 are mounted upon a fixed drum 230 which may be part of the casing 225 of the aircraft. The gases which furnish propulsion for the turbine 231 are supplied from a combustion chamber 237 suitably located within the fuselage and provided with one or more nozzles 238 through which the gases are projected against the blades of the turbine. Pipes 239 and 240 conduct the fuel and oxygen from the respective sources of supply (not shown) to the chamber 237 where they are ignited as in the forms previously described.

The turbine 232 is similarly provided with blades 241 mounted on a rotatable drum 242 and blades 243 on the fixed drum 243a. The gases to operate this turbine enter the turbine casing through the nozzle 244 from the combustion chamber 245, the fuel and oxygen entering this chamber 245 through flexible pipes 246 and 247 respectively. Suitable fixed frames as 248 and 249 support the casing 225 in the vicinity of the propeller blades and the drums 230 and 243a are integral therewith. These frames are mounted upon the central shaft 226. Similar frames as 250 may be provided at other points to support this casing.

Casing sections 251 and 252 in the form of overlapping rings rotate with the blades 227 and 228 respectively and form an enclosure for the opening in the casing in which the propeller blades travel. In order to permit the blades 227 and 228 to be withdrawn within the body of the aircraft, these blades may be arranged to slide radially upon disks 254 and 255 forming portions of the rotors of the turbines 231 and 232.

The inner ends of the propeller blades 227 and 228 are provided with blocks 256 and 257 having tenons which dovetail in correspondingly formed radial guideways 258 and 259 in the disks 254 and 255 respectively, the blocks being slidable in such guideways. The extension and withdrawal of the blades is provided by screws 260 and 261 carrying at their lower ends pinions 262 and 263 which are rotated by racks 264, 265, 266 and 267. These racks are mounted upon a sleeve 268 which is longitudinally slidable upon the shaft 226. When the sleeve is moved forwardly, the racks 265 and 267 are brought into engagement with the pinions 262 and 263, rotating these pinions in the direction indicated by the arrow thereon and withdrawing the blades as the blades travel about their axis. Similarly, movement of the sleeve in the opposite direction engages the racks 264 and 266 and extends the blades. The shifting of the sleeve 268 may be accomplished in any suitable manner as by a longitudinally slidable rod 269 carrying at its end a grooved collar 270 which engages the inner extremity of a finger 271 attached to the sleeve 268 and projecting through a slot 272 in the wall of the shaft 226.

In order to enable the casing to be completely closed when the propellers are withdrawn, suitable sliding doors as 273 (Fig. 22) may be provided in the casing sections or rings 251 and 252 respectively, two doors being shown for each blade opening. These doors 273 preferably conform in shape to the stream line casing and slide in corresponding chambers 274. Springs as 275 may be provided to cause these doors to constantly press against the propeller blades and completely close the openings as soon as the propeller is sufficiently withdrawn to permit. The doors preferably form air-tight closures for the openings as already described in connection with similar parts.

In Fig. 23 is shown a further modification somewhat similar to the one shown in Figs. 21 and 22, but differing principally in that the sets of blades 290 and 291 are caused to rotate in opposite directions by a single turbine as 292. In the turbine 292 alternating sets of blades rotate in opposite directions, the blades 293 rotating in one direction and blades 294 in the reverse direction. The turbine blades 293 are carried by a revoluble sleeve 295 upon which is mounted a disk 296 carrying the propeller blades 291. The blades 294 are mounted upon the inner surface of a drum 297 which is integral with a disk 298 carrying the propeller blades 290. This turbine is operated by gases generated in a combustion chamber 299 and projected into the turbine through a nozzle 300. After impinging upon the blades 293 and 294 of the turbine, the gases pass into the space between the disks 296 and 298 and enter an exhaust tube or passage as 301. The gases exhausting through the tube 301 may be caused to pass into a hollow space as 307 within the walls of the main casing 308 of the aircraft, and thus form an effective means of heating the aircraft. This space 307 may terminate in an opening (not shown) at the rear of the aircraft.

The disks 296 and 298 are revolubly mounted upon a fixed central shaft 302 supported within the body of the aircraft as at 303 with its axis coincident with the longitudinal axis of such body. The blades 290 and 291 are respectively caused to move inwardly or outwardly by rack members 304 and 305 shiftable laterally by a rod 306 within the fixed shaft 302. The ability to move the propeller blades 290 and 291 outwardly or inwardly has a further advantage in that the blades may be fully extended at high elevations where the air is rare, thus presenting a relatively large working surface, or partially withdrawn at lower altitudes where the greater density of the air offers greater resistance. This also applies to the propeller construction shown in Figs. 21 and 22.

Still referring to Fig. 23, the wings comprise connecting portions 309 and 310, of proper airfoil camber in cross section, which support a main airfoil portion 311 also of proper camber leaving a space 312 through which the blades 290 and 291 pass.

From the foregoing description it will be evident that the aircraft forming the subject matter of the present invention is simple and practical in construction and capable of efficient operation under practically all conditions. The form of propulsion may be readily changed in flight to provide the most effective means for the particular conditions under which the aircraft is operating at the time. The turbo-propeller construction in which the turbine forms a part of the propeller provides a simple, compact and efficient type of propulsion. The propellers may be partially or completely withdrawn into the aircraft and effective means are provided to close all openings in the casing so that normal atmospheric pressure may be maintained at all times therein. The stream line form of the doors and windows offers a minimum of air resistance and the arrangement of the windows permits vision in all directions. The mirrors facilitate the use of these windows. The insulating of the walls of the casing protects the occupants from exposure to low temperatures and further comfort is provided by the utilization of the exhaust gases within these walls. When operating by rocket propulsion particularly, the various projecting parts such as the propellers, turbines, landing gear, etc. may be readily withdrawn within the casing. The wings are extensible and retractable in accordance with the conditions under which the aircraft is operating and air-tight joints are provided between the wing extensions and the main wings. The controlling elements such as the elevators, rudder, etc. may be extended or retracted in accordance with the speed and atmospheric conditions. In the forms of the aircraft in which the propeller is folded for withdrawal, this may be readily accomplished from within the aircraft. Simple means are provided to lock the propeller in the proper position for withdrawal.

As many possible embodiments may be made of the above invention and as many changes might be made in the embodiment above set forth, it is to be understood that all matter hereinbefore set forth or shown in the accompanying drawings is to be interpreted as illustrative and not in a limiting sense.

I claim:

1. In an aircraft, propulsion apparatus comprising propeller blades projecting from the fuselage, and turbine blades associated therewith and driving said propeller blades and being located near the periphery of the fuselage which is circular in cross section whereby the turbine blades travel in a circle nearly as large in diameter as the propeller blades, there being direct drive connection between said separate sets of blades and the turbine being housed in the fuselage for reduction of parasite resistance.

2. In an aircraft, propulsion apparatus comprising propeller blades projecting from the fuselage, turbine blades associated therewith and driving said propeller blades and being located near the periphery of the fuselage which is circular in cross-section whereby the turbine blades travel in a circle nearly as large in diameter as the propeller blades, there being direct drive connection between said separate sets of blades and the turbine being housed in the fuselage for reduction of parasite resistance, and means for moving said blades in a radial direction to expose more or less of their propeller surfaces for action upon the air.

3. An aircraft comprising a torpedo shaped fuselage, a pair of propellers mounted coaxially with said fuselage and with each other the blades whereof describe arcs around said fuselage with the pitch of the blades of the respective propellers oppositely disposed, and two sets of turbine blades associated with said propellers one set being direct connected to one propeller and the other set being direct connected to the other propeller and each set being located near the periphery of the fuselage whereby the turbine blades travel in a circle nearly as large in diameter as the propellers, and gas discharge means to actuate the turbine blades housed in the fuselage for reduction of parasite resistance.

4. Aircraft propulsion apparatus comprising, in combination, streamline housing structure having a fore and aft axis, prime mover mechanism mounted within said housing structure and including a rotatable driving element mounted coaxial with the aforesaid fore and aft axis, the housing structure having a substantially circular cross-section adjacent the said driving element, a pair of propeller blades each direct connected to the said rotatable driving element for rotation therewith but each movable radially, guides permitting said radial movement, and screws extending radially revolution of which moves said blades radially, whereby to vary the effective propeller area.

5. Aircraft propulsion apparatus comprising, in combination, streamline housing structure having a fore and aft axis, prime mover mechanism mounted within said housing structure and including a rotatable driving element mounted coaxial with the aforesaid fore and aft axis, the housing structure having a substantially circular cross-section adjacent the said driving element, a pair of propeller blades each direct connected to the said rotatable driving element for rotation therewith but each movable radially, guides permitting said radial movement, screws extending radially revolution of which moves said blades radially, and a non-rotating control for actuating said screws to vary the effective propeller area while the propeller is rotating by moving the blades radially.

ROBERT H. GODDARD.